No. 636,093. Patented Oct. 31, 1899.
M. L. WHITFIELD.
ELECTROMEDICAL APPARATUS.
(Application filed Mar. 29, 1899.)
(No Model.)
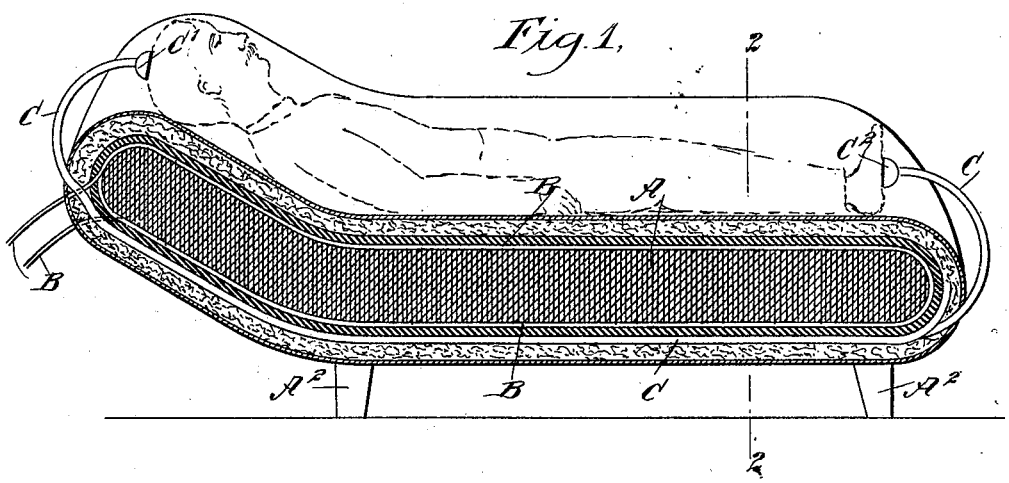
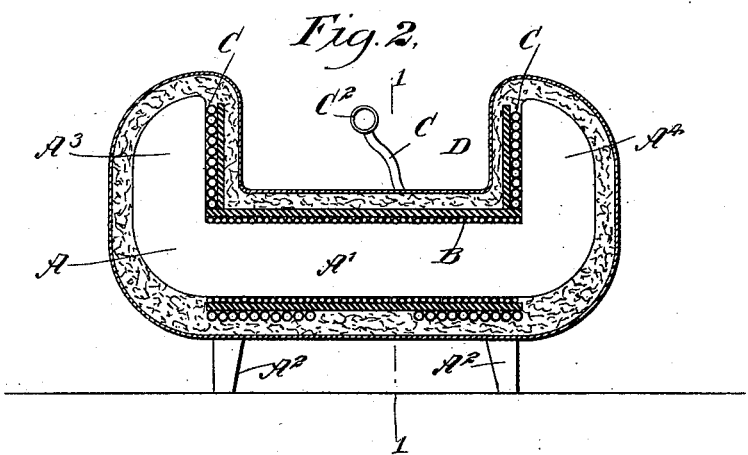
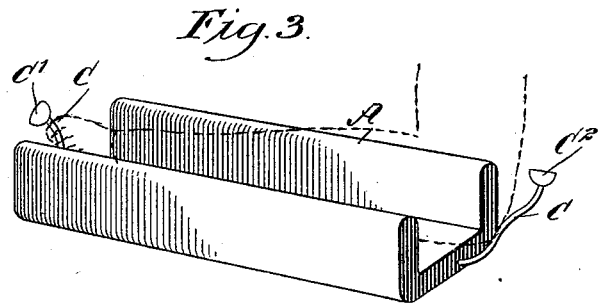
WITNESSES:
Edward Thorpe
INVENTOR
Mercy L. Whitfield
BY
ATTORNEYS.
THE NORRIS PETERS CO., PHOTO-LITHO., WASHINGTON, D. C.

UNITED STATES PATENT OFFICE.

MARCY L. WHITFIELD, OF MEMPHIS, TENNESSEE, ASSIGNOR OF ONE-HALF TO CHARLES C. COWAN, OF SAME PLACE.

ELECTROMEDICAL APPARATUS.

SPECIFICATION forming part of Letters Patent No. 636,093, dated October 31, 1899.

Application filed March 29, 1899. Serial No. 710,943. (No model.)

*To all whom it may concern:*

Be it known that I, MARCY L. WHITFIELD, of Memphis, in the county of Shelby and State of Tennessee, have invented a new and Improved Electromedical Apparatus, of which the following is a full, clear, and exact description.

The object of the invention is to provide a new and improved electromedical apparatus which is simple and durable in construction and more especially designed for treating diseases of the animal body or parts thereof, for invigorating relaxed muscles and other parts of the body, and for other purposes to accomplish the desired result.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of the apparatus in the form of a couch for treating the entire animal body, the section being taken on the line 1 1 in Fig. 2. Fig. 2 is a transverse section of the same on the line 2 2 in Fig. 1, and Fig. 3 is a perspective view of a modified form of the apparatus arranged for treating part of the animal body.

In apparatus for treating diseases of the animal body as heretofore constructed it was impossible to obtain successful results for the reason that the electric current used was generated by outside means and passed into the body, so that the current was conducted by the blood fluid after once reaching it, and hence did not come in contact with adjacent substances, except those over which the current had to pass on entering and leaving the body or part. By the method and apparatus hereinafter more fully described in detail I am enabled to successfully reach and treat the entire body or any desired part thereof by causing induction to take place in the patient's body or in that part of the body to be treated, so that every atom composing the body or part when placed within the influence of a changing magnetic field or force interrupts lines of force to generate electricity and to form a conductor of electric currents the same as the atoms composing the metal of a secondary copper wire in an induction-coil.

The improved apparatus is provided with a transformer-core, which may be in the shape of a couch, as illustrated in Fig. 1, and horseshoe-shaped in cross-section, as indicated in Fig. 2, to allow of treating the entire animal body; but when it is desired to treat a part of the animal body a different shape is given to the transformer-core, as illustrated, for instance, in Fig. 3, in which the transformer is in the shape of a trough for receiving an arm or leg to be treated. The transformer, as shown in Figs. 1 and 2, is provided with a bottom portion A', mounted on legs $A^2$ and provided with side flanges $A^3$ $A^4$, the strands of a primary coil B passing over the top and under surfaces of the bottom A' in a longitudinal direction, as is plainly indicated in the drawings, the ends of said coil being connected with a battery and interrupter or other suitable source of electric supply. On the inner faces of the side flanges $A^3$ $A^4$ are arranged in a longitudinal direction the strands of an induction-coil C, so as to leave a space D between the said flanges for the body to be treated, the ends of the secondary coil being provided with terminals $C'$ $C^2$, for contacting with the ends of the animal body—say the head and feet.

In the construction shown in Fig. 3 the terminals of the secondary or induction coil are placed in contact with the ends of the part to be treated, the body or part in either case forming a circuit-closer for the induction or secondary coil.

The patient to be treated is placed on the induction-couch in a lengthwise direction, so that the body forms in a magnetic sense one of the strands of the secondary coil C, the terminals $C'$ $C^2$ being in contact with the ends of the body, as above mentioned. By this arrangement the body is within the influence of a changing magnetic field or force and interrupts lines of force, and thereby becomes a generator and conductor of electric currents, which pass through the entire body. The terminals $C'$ $C^2$ are sufficiently flexible to permit of placing the same in contact with but a part of the body—for instance, one terminal with a knee and the other terminal with a foot. Then the current will flow only between the terminals, or the feet and knees, and as the rest of the body is out of the circuit, although in the field of force, which is in effect what is known as a "dead" end, no current will flow in that part above the knees except a slight secondary current, which will be generated in the blood by reason of its circulation. It is understood that in order to avoid this slight secondary current in the part not to be treated I prefer to provide different forms of apparatus for treating individual parts, as above mentioned, so that the inducing lines of force only pass through the desired part.

From the foregoing it is evident that it is possible to form countless combinations in the character of the effect produced by varying the speed of reversals and phase of the exciting-current, which, it is thought, will cause electricity to become a specific for different diseases instead of an uncertain remedy, as is the case with the present apparatus now used.

It is understood that the couch is properly upholstered to form an easy resting-place for the patient.

By means of the above-described apparatus a magnetic area is produced for enveloping the body or part, by "magnetic" area being meant the magnetic influence the core exerts on its immediate surroundings, and consequently a body or part in the surroundings comes under the magnetic influence of the core.

Having thus fully described my invention, I claim as new and desire to secure by Letters Patent—

1. The method of treating disease which consists in placing the body or part thereof to be treated within the influence of a changing field of magnetic force, and including said body or part in that portion of a secondary circuit in which currents are generated by said changing field of magnetic force, for the purpose set forth.

2. An electromagnetic apparatus comprising a transformer having a magnetic area for enveloping the body or part to be treated, and a secondary circuit arranged to carry currents generated by the transformer, the terminals of which secondary circuit form contacts for said body or part thereof to be treated, substantially as set forth.

3. An electromagnetic apparatus, comprising a transformer-core having a magnetic area for enveloping the part to be treated, a primary coil on said transformer, and a secondary coil arranged on said core and having its terminals forming the contact-points for the body or part to be treated, substantially as shown and described.

4. An electromagnetic apparatus, comprising a transformer-core made U-shaped in cross-section to form a magnetic area for enveloping the body or part to be treated, a primary coil arranged lengthwise around the bottom portion of said transformer-core, and a secondary coil arranged lengthwise on the inner, opposite faces of the side flanges of said transformer-core, the ends or terminals of the secondary coil forming contact-points for the part to be treated, substantially as shown and described.

MARCY L. WHITFIELD.

Witnesses:
  THEO. G. HOSTER,
  EVERARD BOLTON MARSHALL.